(12) United States Patent
Birman et al.

(10) Patent No.: US 9,365,159 B2
(45) Date of Patent: Jun. 14, 2016

(54) NEGATIVE SLOPE POINTER

(71) Applicant: Continental Automotive Systems, Inc., Auburn Hills, MI (US)

(72) Inventors: Vyacheslav B. Birman, Auburn Hills, MI (US); Christopher J. Volpe, Waterford, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 227 days.

(21) Appl. No.: 14/101,413

(22) Filed: Dec. 10, 2013

(65) Prior Publication Data

US 2014/0165904 A1 Jun. 19, 2014

Related U.S. Application Data

(60) Provisional application No. 61/738,431, filed on Dec. 18, 2012.

(51) Int. Cl.
*G01D 13/22* (2006.01)
*G01D 11/28* (2006.01)
*B60Q 9/00* (2006.01)
*G01D 13/26* (2006.01)

(52) U.S. Cl.
CPC ............... *B60Q 9/00* (2013.01); *G01D 13/265* (2013.01)

(58) Field of Classification Search
CPC ...... G01D 13/22; G01D 13/26; G01D 13/265
USPC .................. 116/286, 287, 288, 328, 330, 332, 116/DIG. 6; 362/23.21
See application file for complete search history.

(56) References Cited

U.S. PATENT DOCUMENTS

| 4,300,470 | A | * | 11/1981 | Furukawa | ............... | G01D 13/22 116/288 |
| 5,842,435 | A | * | 12/1998 | Tsukamoto et al. | ... | G01D 13/28 116/26 |
| 6,511,194 | B1 | * | 1/2003 | Noll et al. | ............... | G01D 11/28 116/286 |
| 2008/0264328 | A1 | * | 10/2008 | Birman et al. | ......... | G01D 11/28 116/288 |
| 2011/0061586 | A1 | | 3/2011 | Wang et al. | | |

FOREIGN PATENT DOCUMENTS

| JP | 05157587 A | * | 6/1993 | ............. | G01D 13/22 |
| JP | 2008116391 A | * | 5/2008 | ............. | G01D 13/22 |

\* cited by examiner

*Primary Examiner* — R. A Smiith

(57) ABSTRACT

A gauge assembly for a motor vehicle includes a gauge surface with graphics representing a vehicle operating parameter and a pointer supported for movement about an axis to indicate a current condition of the vehicle operating parameter by pointing to a specific location on the gauge surface. The pointer includes a pointer arm extending away from a hub and a bottom surface with a negative slope angled away from a plane normal to the axis toward the gauge surface.

13 Claims, 3 Drawing Sheets

NEGATIVE SLOPE POINTER

CROSS REFERENCE TO RELATED APPLICATION

This application claims priority to U.S. Provisional Application No. 61/738,431 filed on Dec. 18, 2012.

TECHNICAL FIELD

The present disclosure relates to vehicle instrument panels and clusters, and more specifically to a pointer for a gauge that includes features providing uniform illumination.

BACKGROUND

Vehicles include instrument panels to communicate information indicative of operation to an operator. Motor vehicles include instrument panels with several gauges and dials that communicate vehicle conditions such as speed, engine rpm, temperature, oil pressure along with many other operational parameters. A pointer is typically provided that rotates about a fixed axis that points to value on the gauge face to communicate current values of an operational parameter. Pointers are often illuminated to further enhance visibility and appearance. Light sources that direct light along the axis or rotation can cause a bright spot at the axis on the pointer.

The geometry of the pointer including relative angles and widths between surfaces of the pointer provide a means of uniformly propagating light from a hub to a pointer tip. The size and shape of a pointer possible is limited by manufacturing practicalities such as possible mold draft angles.

Accordingly, it is desirable to design and develop a pointer that provides uniform illumination within manufacturing capabilities that increases an area in which luminance may be evenly distributed.

SUMMARY

A gauge assembly for a motor vehicle includes a gauge surface with graphics representing a vehicle operating parameter and a pointer supported for movement about an axis to indicate a current condition of the vehicle operating parameter by pointing to a specific location on the gauge surface. The pointer includes a pointer arm extending away from a hub and a bottom surface with a negative slope angled away from a plane normal to the axis toward the gauge surface.

The negative slope of a bottom surface generates a substantially uniform luminance over a larger area and pointer length. Moreover, the initial negative slope substantially provides a uniform luminance in pointers that include large differences in thickness between the hub and tip.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
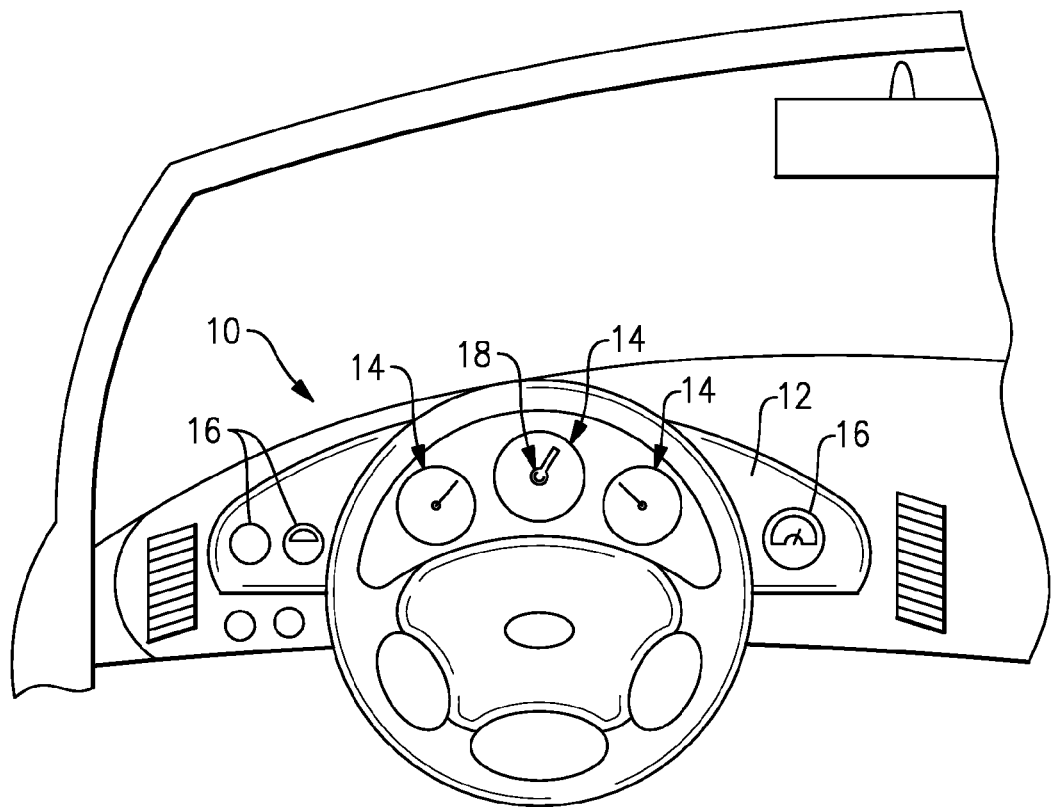
FIG. 1 is a schematic view of an example instrument panel for a motor vehicle.

FIG. 1 schematically illustrates a dashboard 10 for a motor vehicle. The dashboard 10 includes an instrument panel 12 that includes a plurality of gauges 14 and dials 16. The gauges 14 communicate information indicative of vehicle operating parameters to vehicle operator. A pointer assembly 18 is included for the gauge 14 that rotates about an axis A to point to a specific portion of the graphics provided in each of the gauges 14 to indicate a current value of an operating condition.

Figure 2:
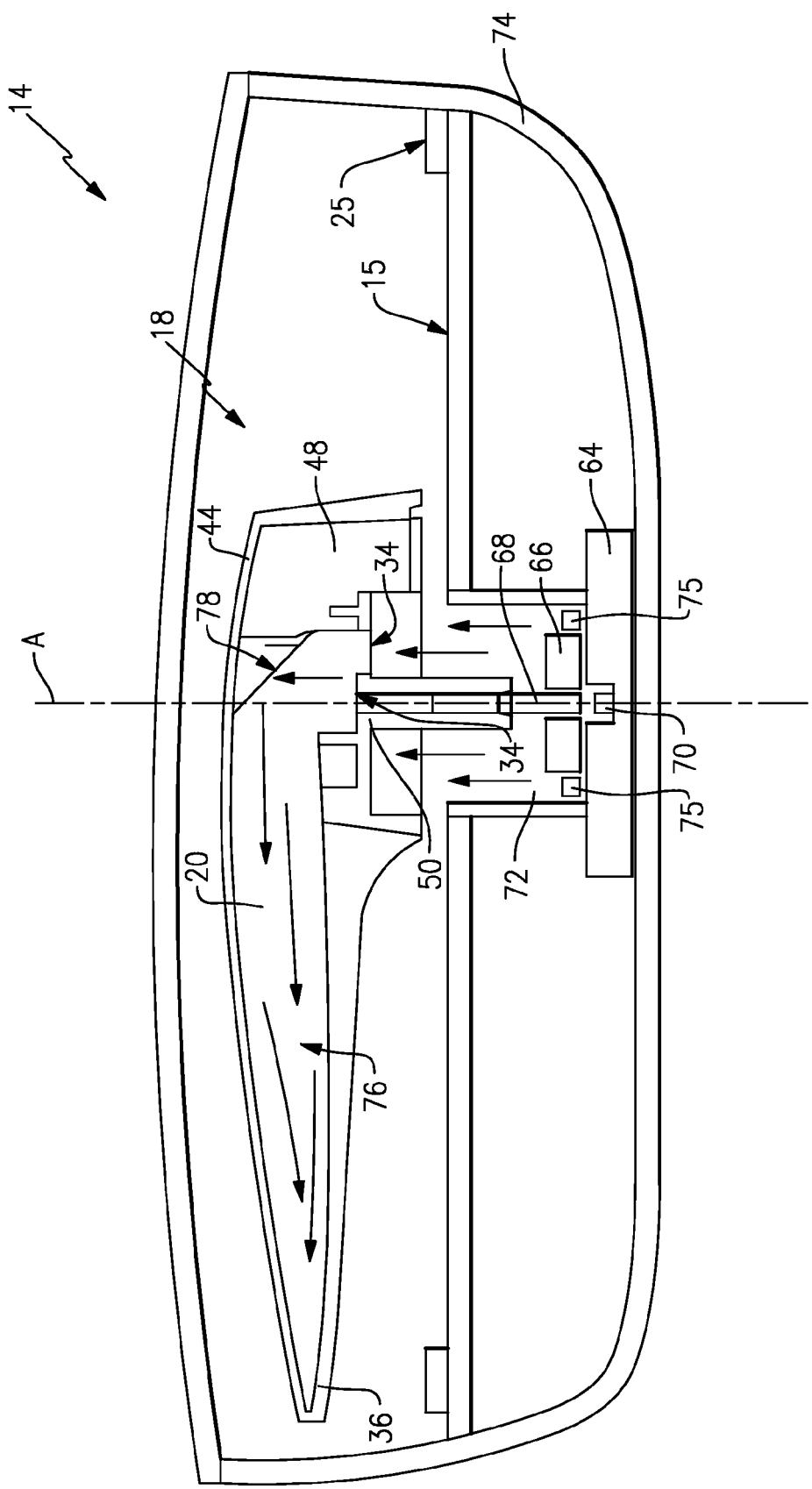
FIG. 2 is a cross-section of an example gauge assembly.

Referring to FIG. 2, an example gauge assembly 14 includes a housing 74 that supports a gauge surface 15 with graphics 25. A printed circuit board 64 supports a stepper motor 66 that drives a shaft 68. The shaft 68 maybe a clear shaft or a shaft including a central opening through which light may propagate upwardly into the pointer assembly 18.

A shroud 50 is supported on the shaft 68. A light source 70 is supported on the printed circuit board 64 along an axis A. A light housing 72 surrounds the light source 70 and extends upward to the gauge surface 15. The light source 70 may propagate light upward into the pointer assembly 18 along the axis A. Other light sources 75 are disposed on the printed circuit board 64. The light source 70 along the axis A may be utilized to direct light along the axis A. The light sources 75 may also be utilized that are disposed around the axis A within the light housing 72 to direct light upward into the pointer assembly 18, either configuration or combination of is within the contemplation of this disclosure.

Figure 3:
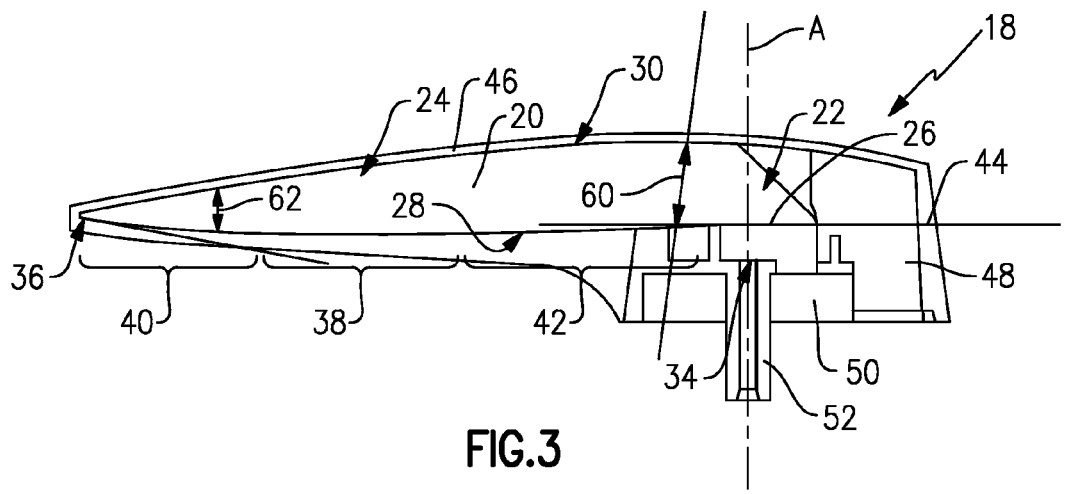
FIG. 3 is a cross-section of an example pointer assembly.

Referring to FIG. 3, with continued reference to FIG. 2, the pointer assembly 18 includes a pointer 20 that includes a base 22 disposed about the axis A and arm 24. The shaft 68 is clear such that it will propagate light from the light source 70 upward into the pointer 20. In this example, the light sources 70, 75 is a light emitting diode; however, other light sources as are known are also within the contemplation of this disclosure. Light 76 enters the pointer 20 through a light receiving surfaces 34 and is reflected by a light reflecting surface 78 toward a tip 36.

A cap 44 is disposed over the base 22 of the pointer 20 eliminate a possible viewable bright spot of the pointer 20. The cap 44 includes an arm portion 46 that extends toward the tip 36. A counterweight 48 is supported by the shroud 50 under the cap 44. The shroud 50 includes a shroud stem 52 that includes a central opening 54 along the axis A that receives the shaft 68. The pointer arm 24 includes a first height 60 disposed near the base and tapers to a second height 62 near the tip 36.

The pointer 20 includes a top surface 30 and a bottom surface 28. The bottom surface 28 includes a first portion 42 near the base 22, a midway portion 38 spaced radially outward toward the tip 36 and a tip portion 40 near the tip 36. The bottom surface 28 includes a negative angle within the first portion 42 that increases the area within the pointer 20 that is illuminated uniformly.

Figure 4:
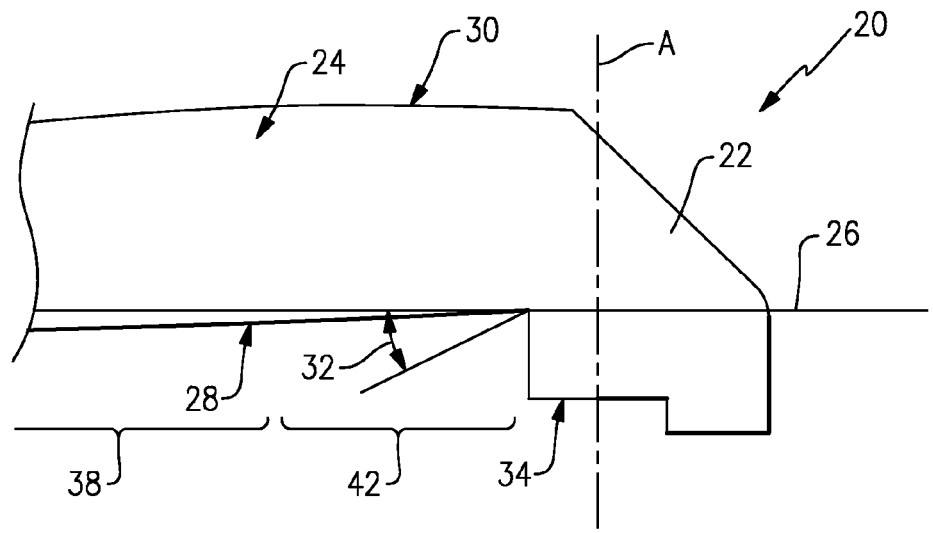
FIG. 4 is an enlarged cross-section of the example pointer assembly.

Referring to FIG. 4 with continued reference to FIG. 4, the bottom surface 28 initially slopes downward or negatively in a direction toward the gauge surface 15 at an angle 32. The angle 32 is sloped negatively from a plane 26 normal to the axis A. The negative slope uniformly propagates light 76 through the pointer 20.

The bottom surface 28 tapers upward in the midway portion 38 from the initial negative slope angle 32. In the midway portion 38, the bottom surface 28 is substantially parallel with the plane 26 normal to the axis A. In the tip portion 40 of the bottom surface 28 tapers upward at a positive angle relative to the plane 26 normal to the axis A. The upward slope of the bottom surface further aids in generating uniform luminance throughout the pointer arm 24.

Figure 5:
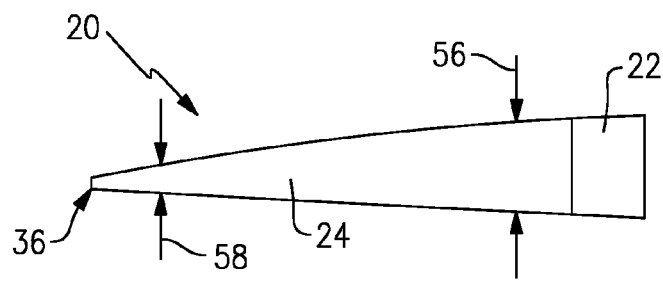
FIG. 5 is a top view of the example pointer.

Referring to FIG. 5 with continued reference to FIGS. 3 and 4, the example pointer 20 includes a first width 56 near the base 22 that tapers toward a second width 58 near the tip 36. The decreasing width of the pointer arm 24 further provides the desired uniform illumination of the pointer 20.

Accordingly, the example pointer assembly 18 includes an initial negative slope of a bottom surface that generates a substantially uniform luminance over a larger area and pointer length. Moreover, the initial negative slope substantially provides a uniform luminance in pointers that include large differences in thickness between the hub and tip.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gauge assembly comprising:
a gauge surface including graphics representing a vehicle operating parameter; and
a pointer supported for movement about an axis to indicate a current condition of the vehicle operating parameter by pointing to a specific location on the gauge surface, the pointer including a pointer arm extending away from a hub toward a tip and a bottom surface including a first portion with a negative slope angled away from a plane normal to the axis toward the gauge surface, a midway portion that tapers toward the plane normal to the axis in a direction away from the negative slope and a tip portion including a positive slope from the second portion toward the tip, and wherein the hub includes a light receiving surface for propagating light through the pointer arm.

2. The gauge assembly as recited in claim 1, wherein the pointer arm includes a first height proximate the hub and tapers to a second height less than the first height in a direction toward the tip.

3. The gauge assembly as recited in claim 2, wherein the pointer includes a top surface with a width greater than the bottom surface.

4. The gauge assembly as recited in claim 1, including a cap disposed over at least the hub of the pointer.

5. The gauge assembly as recited in claim 4, wherein the cap includes an arm portion disposed over the pointer arm.

6. The gauge assembly as recited in claim 5, including a shroud supporting the pointer for rotation about the axis.

7. The gauge assembly as recited in claim 6, including a counterweight supported on the shroud opposite the pointer arm.

8. A pointer assembly comprising:
a pointer supported for movement about an axis to indicate a current condition of a vehicle operating parameter on a gauge surface, the pointer including a pointer arm extending away from a hub toward a tip and a bottom surface including a first portion with a negative slope angled away from a plane normal to the axis toward the gauge surface, a midway portion that tapers toward the plane normal to the axis in a direction away from the negative slope and a tip portion including a positive slope from the second portion toward the tip, and wherein the hub includes a light receiving surface for propagating light through the pointer arm.

9. The pointer assembly as recited in claim 8, wherein the pointer arm includes a first height proximate the hub and tapers to a second height less than the first height in a direction toward the tip.

10. The pointer assembly as recited in claim 9, wherein the pointer includes a top surface with a width greater than the bottom surface.

11. The pointer assembly as recited in claim 8, including a cap disposed over at least the hub of the pointer.

12. The pointer assembly as recited in claim 8, including a shroud supporting the pointer for rotation about the axis.

13. The pointer assembly as recited in claim 12, including a counterweight supported on the shroud opposite the pointer arm.

* * * * *